(12) United States Patent
Kumada et al.

(10) Patent No.: US 7,389,812 B2
(45) Date of Patent: Jun. 24, 2008

(54) VEHICLE AIR CONDITIONING SYSTEM HAVING NON-CONTACTING TEMPERATURE SENSORS

(75) Inventors: Tatsumi Kumada, Gamagori (JP); Yoshinori Ichishi, Kariya (JP); Tatsuya Ito, Obu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/803,393

(22) Filed: May 14, 2007

(65) Prior Publication Data

US 2007/0215339 A1 Sep. 20, 2007

Related U.S. Application Data

(62) Division of application No. 10/689,364, filed on Oct. 20, 2003.

(30) Foreign Application Priority Data

Oct. 21, 2002 (JP) .............................. 2002-305868

(51) Int. Cl.
 *B60H 1/00* (2006.01)
 *B60H 3/00* (2006.01)
(52) U.S. Cl. ...................... 165/203; 165/202; 165/237; 165/291; 165/42; 165/43; 236/91 C

(58) Field of Classification Search .................. 165/203, 165/202, 201, 237, 42, 43, 291; 236/91 C
See application file for complete search history.

(56) References Cited

U.S. PATENT DOCUMENTS

| 5,725,052 | A | 3/1998 | Kawai et al. |
| 6,397,615 | B1 | 6/2002 | Kawai et al. |
| 6,454,178 | B1 | 9/2002 | Fusco et al. |
| 6,550,686 | B2 | 4/2003 | Kawai et al. |

FOREIGN PATENT DOCUMENTS

| JP | 2001-171327 | 6/2001 |
| JP | 2002-144839 | 5/2002 |
| JP | 2002-172926 | 6/2002 |
| JP | 2002-234332 | 8/2002 |

OTHER PUBLICATIONS

JP Office Action for Application No. 2002-305868 issued on Jun. 7, 2006.

*Primary Examiner*—John K Ford
(74) *Attorney, Agent, or Firm*—Harness, Dickey & Pierce, PLC

(57) ABSTRACT

When a front-passenger seat occupant detecting sensor indicates absence of an occupant in a front-passenger seat, an air conditioning control ECU adjusts a temperature measurement measured with a non-contacting temperature sensor for measuring a surface temperature of the occupant in the front-passenger seat and controls air conditioning state around the front-passenger seat based on the adjusted temperature measurement associated with the front-passenger seat.

2 Claims, 10 Drawing Sheets

VEHICLE AIR CONDITIONING SYSTEM HAVING NON-CONTACTING TEMPERATURE SENSORS

CROSS-REFERENCE TO RELATED APPLICATIONS

This application is a divisional of U.S. patent application Ser. No. 10/689,364 filed on Oct. 20, 2003. This application claims the benefit of JP 2002-305868, filed Oct. 21, 2002. The disclosures of the above applications are incorporated herein by reference.

BACKGROUND OF THE INVENTION

1. Field of the Invention

The present invention relates to a vehicle air conditioning system for controlling air conditioning state of a vehicle based on a temperature measurement of a non-contacting temperature sensor.

2. Description of Related Art

One type of previously proposed vehicle air conditioning system uses a non-contacting temperature sensor (e.g., infrared sensor) to measure a surface temperature of an occupant seated in a vehicle seat and controls air conditioning state of the passenger compartment (e.g., the temperature and the flow rate of air discharged from a discharge opening of the air conditioning system) based on the measured surface temperature of the occupant. One such an air conditioning system is disclosed in Japanese Unexamined Patent publication No. 2002-172926. This air conditioning system will be referred to as a first type air conditioning system.

Another type of previously proposed air conditioning system controls air conditioning state around a driver seat and air conditioning state around a front-passenger seat independently of each other. One such an air conditioning system is disclosed in Japanese Unexamined Patent publication No. 2002-144839. This air conditioning system will be referred to as a second type air conditioning system.

It is conceivable to combine the first type air conditioning system and the second type air conditioning system in such a manner that the surface temperature of the driver seated in the driver seat and the surface temperature of the occupant seated in the front-passenger seat are measured with non-contacting temperature sensors, and the air conditioning state around the driver seat and the air conditioning state around the front-passenger seat are controlled independently of each other based on the measured surface temperature of the driver in the driver seat and the measured surface temperature of the occupant in the front-passenger seat.

However, in such an air conditioning system, when the occupant is absent in the front-passenger seat, the surface temperature of the front-passenger seat is measured instead of the surface temperature of the occupant in the front-passenger seat. Thus, when the air conditioning state around the front-passenger seat is controlled based on the surface temperature of the front-passenger seat, the air conditioning state around the driver seat and the air conditioning state around the front-passenger seat substantially differ from one another. In such a case, an air flow will be supplied from the front-passenger seat air conditioning zone to the driver seat air conditioning zone, resulting in uncomfortable feeling of the driver. Furthermore, in the case where the air conditioning control operation is performed without considering presence or absence of the occupant in the seat, when the occupant returns the seat after a predetermined period of absence, the occupant may feel uncomfortableness.

SUMMARY OF THE INVENTION

The present invention addresses the above disadvantage. Thus, it is an objective of the present invention to provide a vehicle air conditioning system, which controls air conditioning state based on presence or absence of an occupant(s) in a corresponding seat(s) through use of a non-contacting sensor(s) and provides comfortable air conditioning state to the vehicle occupant(s). It is another objective of the present invention to provide a vehicle air conditioning system, which controls air conditioning state based on presence or absence of an occupant(s) in a corresponding seat(s) through use of a non-contacting sensor(s) and provides comfortable air conditioning state to the vehicle occupant(s) who has just returned to his seat.

To achieve the objectives of the present invention, there is provided an air conditioning system for a vehicle that includes a first seat and a second seat. The air conditioning system includes a first discharge opening for discharging conditioning air around the first seat, a second discharge opening for discharging conditioning air around the second seat, a first non-contacting temperature sensor for measuring a surface temperature of an occupant seated in the first seat without contacting the occupant in the first seat, a second non-contacting temperature sensor for measuring a surface temperature of an occupant seated in the second seat without contacting the occupant in the second seat, an occupant detecting means for detecting presence of the occupant in one of the first and second seats, and an air conditioning control means for independently controlling air conditioning state around the first seat and air conditioning state around the second seat according to a first target discharge air temperature determined for the conditioning air to be discharged from the first discharge opening and a second target discharge air temperature determined for the conditioning air to be discharged from the second discharge opening. The air conditioning control means determines the first target discharge air temperature based on a temperature measurement of the first non-contacting temperature sensor and a desired preset temperature of air around the first seat and also determines the second target discharge air temperature based on a temperature measurement of the second non-contacting temperature sensor and a desired preset temperature of air around the second seat. When the occupant detecting means indicates absence of the occupant in the one of the first and second seats, the air conditioning control means adjusts one of the temperature measurement, the preset temperature and the target discharge air temperature associated with the one of the first and second seats and controls the air conditioning state around the one of the first and second seats based on the adjusted one of the temperature measurement, the preset temperature and the target discharge air temperature associated with the one of the first and second seats.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

First Embodiment

A vehicle air conditioning system according to a first embodiment of the present invention will be described with reference to FIGS. 1 and 2.

Figure 1:
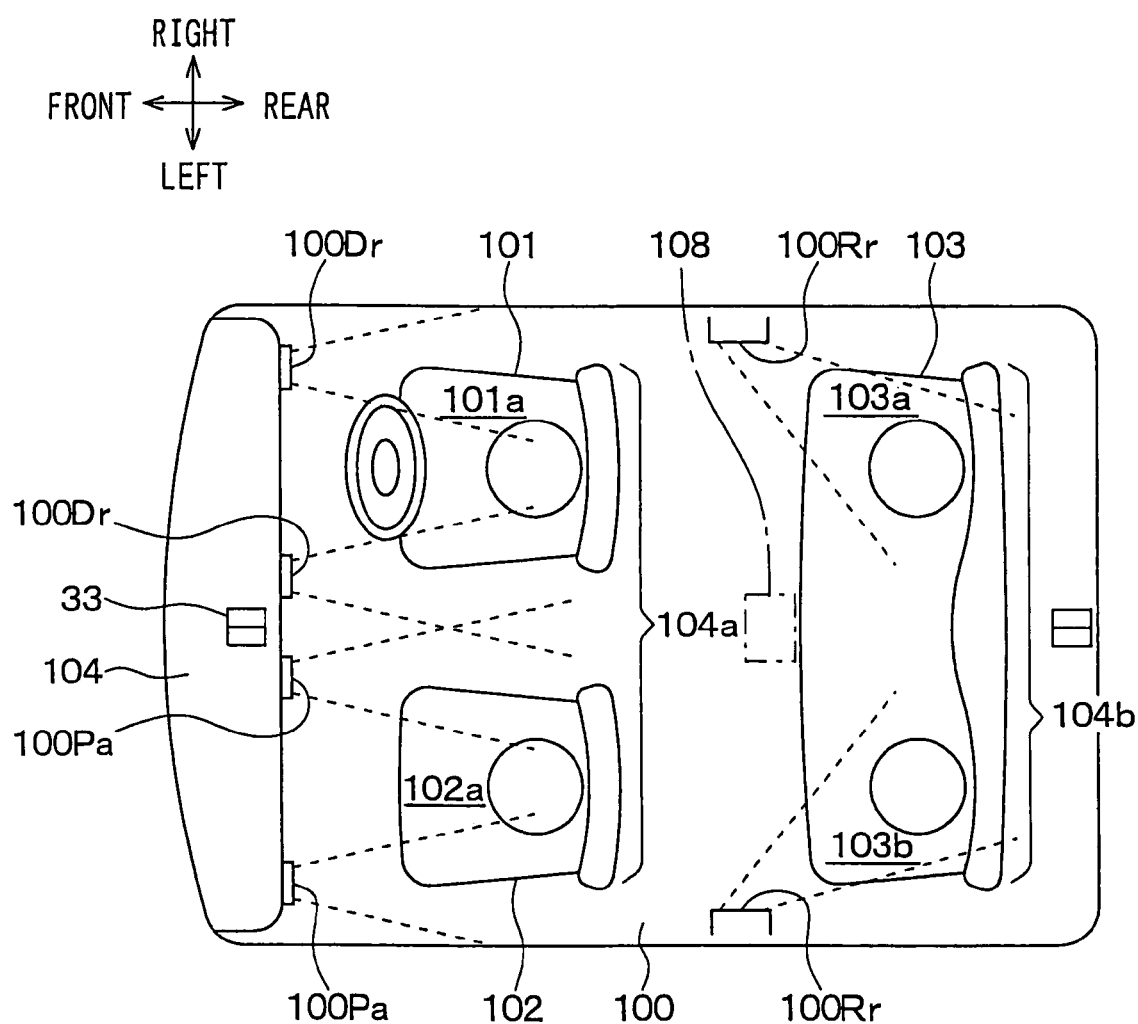
FIG. 1 is a schematic view showing a vehicle air conditioning system according to a first embodiment of the present invention.

First, the vehicle air conditioning system will be outlined with reference to FIG. 1. The vehicle air conditioning system includes a face-side discharge opening 100Dr for discharging conditioning air toward an upper-half body of an occupant in a driver seat 101, a face-side discharge opening 100Pa for discharging conditioning air toward an upper-half body of an occupant in a front-passenger seat (abbreviated as "F-PASS. SEAT" in FIG. 2) 102, and face-side discharge openings 100Rr for discharging conditioning air toward an upper-half body of an occupant(s) in a rear seat 103.

The state (e.g., the temperature, the flow rate) of conditioning air discharged from the face-side discharge opening 100Dr, the state of conditioning air discharged from the face-side discharge opening 100Pa and the state of conditioning air discharged from the face-side discharge openings 100Rr are independently controlled, as described later. Thus, the air conditioning state of a front seat side air conditioning zone 104a and the air conditioning state of a rear seat side air conditioning zone 104b are independently controlled. Furthermore, air conditioning state of a driver seat air conditioning zone 101a and air conditioning state of a front-passenger seat air conditioning zone 102a of the front seat side air conditioning zone 104a are independently controlled.

Next, an entire structure of the vehicle air conditioning system will be schematically described with reference to FIG. 2. As shown in FIG. 2, the vehicle air conditioning system includes a front seat air conditioning unit 1 and a rear seat air conditioning unit 2. The front seat air conditioning unit 1 performs air conditioning of the driver seat air conditioning zone 101a and the front-passenger seat air conditioning zone 102a. The rear seat air conditioning unit 2 performs air conditioning of a driver seat rear side air conditioning zone 103a and a front-passenger seat rear side air conditioning zone 103b. The front seat air conditioning unit 1 is arranged inside an instrument panel 104, and the rear seat air conditioning unit 2 is arranged in a rear side of a passenger compartment 100 (FIG. 1).

The front seat air conditioning unit 1 includes a duct 10, which supplies air into the passenger compartment 100. An inside air intake opening 10a for taking inside air from the passenger compartment 100 and an outside air intake opening 10b for taking outside air located outside the passenger compartment 100 are arranged in the duct 10. Furthermore, the front seat air conditioning unit 1 includes an inside/outside air switching door 11, a blower 12, an evaporator 13 and a heater core 14. The inside/outside air switching door 11 opens one of the inside air intake opening 10a and the outside air intake opening 10b and closes the other one of the inside air intake opening 10a and the outside air intake opening 10b. The blower 12 generates an air flow directed toward the passenger compartment 100. The evaporator 13 cools air through heat exchange between the air and refrigerant of a refrigeration cycle (not shown). The heater core 14 heats air through heat exchange between the air and hot fluid (engine coolant for cooling an engine).

A separation wall 17 is provided in the duct 10 at a location downstream of the evaporator 13. The separation wall 17 separates the duct 10 into a driver seat side passage 10c and a front-passenger seat side passage 10d. The driver seat side passage 10c conducts air to the face-side discharge opening 100Dr located near the driver seat 101. The front-passenger seat side passage 10d conducts air to the face-side discharge opening 100Pa located near the front-passenger seat 102.

An air mix door 15 and a discharge opening switching door 16 are provided in each of the driver seat side passage 10c and the front-passenger seat side passage 10d. The air mix door 15 adjusts the temperature of air discharged into the passenger compartment 100. The discharge opening switching door 16 switches a discharge opening mode (described later) for discharging air toward the front seat side air conditioning zone 104a (i.e., 101a, 102a).

Figure 2:
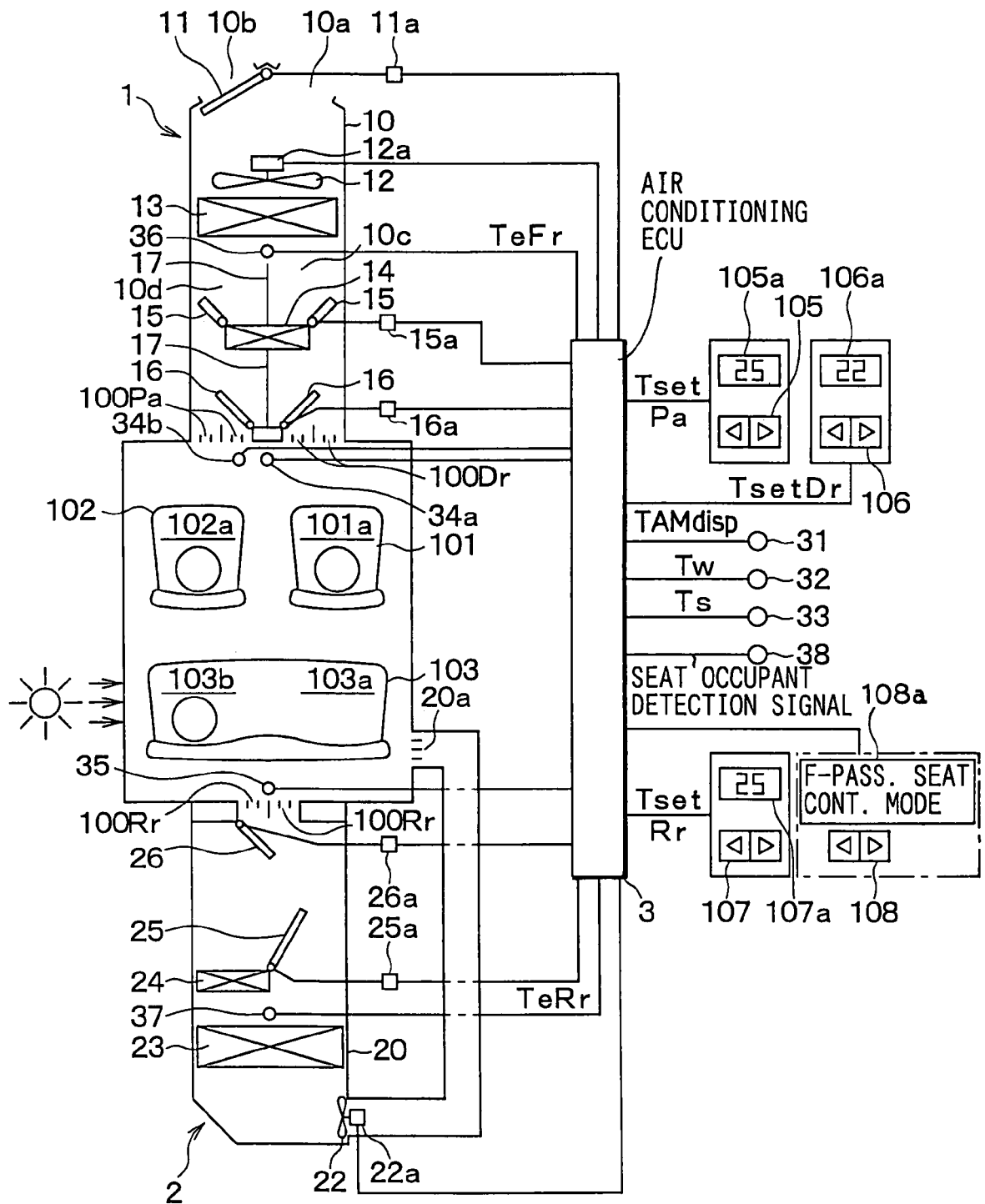
FIG. 2 is a schematic view showing a structure of the vehicle air conditioning system shown in FIG. 1.
Figure 3:
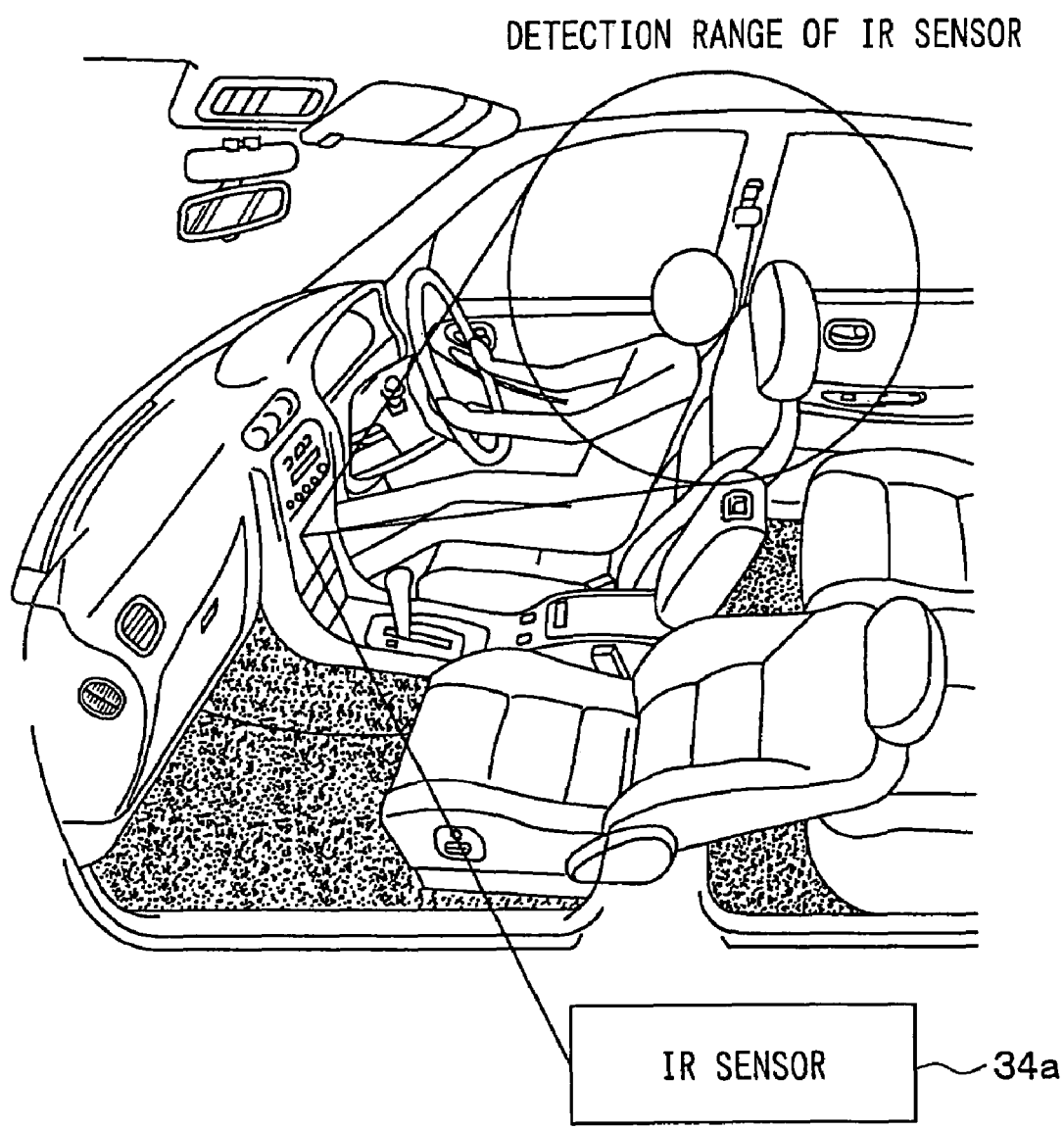
FIG. 3 is a partial schematic view of a passenger compartment of a vehicle showing a sensing area of a non-contacting temperature sensor of the air conditioning system shown in FIG. 1.
Figure 4:
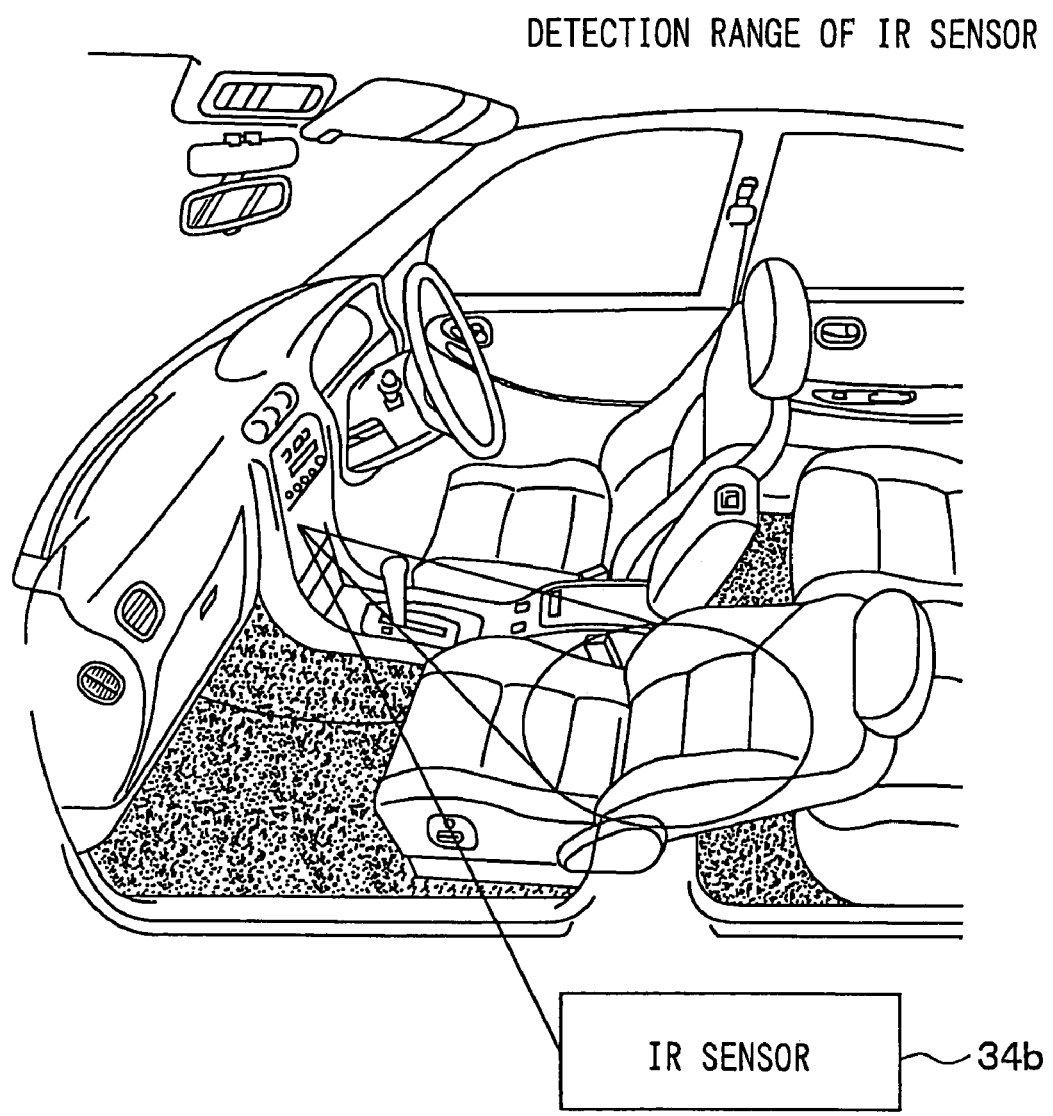
FIG. 4 is another partial schematic view of the passenger compartment showing a sensing area of another non-contacting temperature sensor of the air conditioning system shown in FIG. 1.

It should be understood that although not illustrated in FIG. 2, a foot-side discharge opening and defroster discharge openings are provided in each of the driver seat side passage 10c and the front-passenger seat side passage 10d and are opened and closed by a corresponding discharge opening switching door.

The rear seat air conditioning unit 2 includes a duct 20, which conducts air to the passenger compartment 100. A blower 22, an evaporator 23, a heater core 24, an air mix door 25 and a discharge opening switching door 26 are provided in the duct 20. The blower 22 generates an air flow directed toward the passenger compartment 100. The evaporator 23 cools air through heat exchange between the air and refrigerant of the refrigeration cycle (not shown). The heater core 24 heats the air. The air mix door 25 adjusts the temperature of air discharged into the passenger compartment 100. The discharge opening switching door 26 switches a discharge opening mode for discharging air toward the rear seat side air conditioning zone 104b (i.e., 103a, 103b).

The front seat air conditioning unit 1 and the rear seat air conditioning unit 2 are controlled by a common air conditioning control unit (hereinafter referred to as an air conditioning ECU) 3, which serves as an air conditioning control means of the present invention.

The air conditioning ECU 3 receives signals indicative of an outside air temperature TAMdisp measured with an outside air temperature sensor 31, a coolant temperature Tw of the engine measured with a coolant temperature sensor 32, an amount of solar radiation TsDr of the driver seat side measured with a solar radiation sensor (solar radiation sensing means) 33, an amount of solar radiation TsPa of the front-passenger seat side measured with the solar radiation sensor 33, a post-evaporator air temperature TeFr of the evaporator 13 measured with a post-evaporator air temperature sensor 36, a post-evaporator air temperature TeRr of the evaporator 23 measured with a post-evaporator air temperature sensor 37, a desired preset temperature TSETPa for the front-passenger seat air conditioning zone 102a outputted from a temperature setting device (a left and right control value setting means) 105, a desired preset temperature TSETDr for the driver seat air conditioning zone 101a outputted from a temperature setting device (the left and right control value setting means) 106, and a desired preset temperature TSETRr for the rear seat air conditioning zone 104b outputted from a temperature setting device (the left and right control value setting means) 107.

The air conditioning ECU 3 further receives a seat occupant detection signal outputted from a front-passenger seat occupant detecting sensor 38 for detecting presence of an occupant in the front-passenger seat 102, a measurement signal outputted from a non-contacting temperature sensor 34a for measuring a surface temperature of the upper-half body of the driver in the driver seat 101, a measurement signal outputted from a non-contacting temperature sensor 34b for measuring a surface temperature of the upper-half body of the occupant in the front-passenger seat 102, and a measurement signal outputted from a non-contacting temperature sensor 35 for measuring the surface temperature of the upper-half body of the occupant in the rear seat 103.

In this embodiment, a pressure sensor, which is embedded in the front-passenger seat 102 and senses the pressure applied from the occupant present in the front-passenger seat 102, is used as the front-passenger seat occupant detecting sensor 38, which serves as an occupant detecting means of the present invention. Furthermore, an infrared sensor, which generates electromotive force that corresponds to the infrared inputted thereto, is used as each non-contacting temperature sensor 34a, 34b. A display (a preset temperature displaying means) 105a, 106a, 107a for displaying the desired preset temperature set by the occupant is provided adjacent the corresponding temperature setting device (temperature setting means) 105, 106, 107.

The air conditioning ECU 3 executes predetermined arithmetic processes based on the various input signals and outputs various control signals. Accordingly, a servo-motor 11a drives the inside/outside air switching door 11 based on the control signal outputted from the air conditioning ECU 3. Furthermore, drive motors 12a, 22a drive the corresponding blowers 12, 22 based on the control signals outputted from the air conditioning ECU 3. Also, servo-motors 15a, 25a drive the corresponding air mix doors 15, 25 based on the control signals outputted from the air conditioning ECU 3. Furthermore, servo-motors 16a, 26a drive the discharge opening switching doors 16, 26 based on the control signals outputted from the air conditioning ECU 3.

Next, control operation performed by the air conditioning ECU 3 for controlling the front seat air conditioning unit 1 will be described with reference to a flowchart shown in FIG. 5. After turning on of a corresponding power supply, the air conditioning ECU 3 executes a control program (a computer program) stored in a memory to perform the air conditioning control operation according to the flowchart shown in FIG. 5.

Each cycle of the control operation starts at step S100. At step S100, it is determined whether an occupant is absent in the front-passenger seat 102 based on the measurement signal outputted from the front-passenger seat occupant detecting sensor 38. Specifically, when the pressure applied to the front-passenger seat occupant detecting sensor 38 is equal to or greater than a predetermined value, it is determined that the occupant is present in the front-passenger seat 102, and control proceeds to step S103.

At step S103, the surface temperature of the upper-half body of the driver (hereinafter referred to as the measured surface temperature TIRDR), which is measured with the non-contacting temperature sensor 34a, is obtained. Then, the last fifteen measurements of the surface temperature TIRDR each obtained at step S103 in each cycle and the current measurement of the surface temperature TIRDR are averaged, so that the latest sixteen measurements are averaged. The averaged surface temperature will be referred to as the average temperature TIRDR(16).

Also, at step S103, the surface temperature of the upper-half body of the occupant in the front-passenger seat 102 (hereinafter referred to as the measured surface temperature TIRPA), which is measured with the non-contacting temperature sensor 34b, is obtained. Then, the last fifteen measurements of the surface temperature TIRPA each obtained at step S103 in each cycle and the current measurement of the surface temperature TIRPA are averaged, so that the latest sixteen measurements are averaged. The averaged surface temperature will be referred to as the average temperature TIRPA(16).

Then, the averaged temperature TIRDR(16) is applied to the following first equation to obtain a driver seat side target discharge air temperature TAODr, and the averaged temperature TIRPA(16) is applied to the following second equation to obtain a front-passenger seat side target discharge air temperature TAOPa. In the following first and second equations, Kset (=7.0) is a coefficient for the preset temperature, KIR (=5.1) is an IR coefficient, Kam (=1.0) is an outside air temperature coefficient, and C (=−45) is a correction coefficient. Furthermore, a unit of each of the desired preset temperatures TSETDr, TSETPa, the measured surface temperatures TIRDR, TIRPA, the measured outside air temperature TAMdisp is degrees Celsius.

$$TAODr = Kset \times TSETDr - KIR \times TIRDR(16) - Kam \times TAMdisp + C \quad \text{(First Equation)}$$

$$TAOPa = Kset \times TSETPa - KIR \times TIRPA(16) - Kam \times TAMdisp + C \quad \text{(Second Equation)}$$

Figure 6:
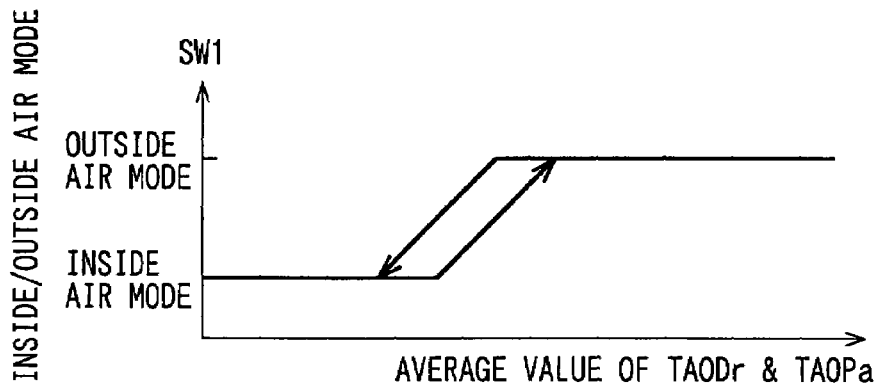
FIG. 6 is a graph showing operation of the control unit of the air conditioning system shown in FIG. 1.

Upon computation of the driver seat side target discharge air temperature TAODr and the front-passenger seat side target discharge air temperature TAOPa, an average value of the driver seat side target discharge air temperature TAODr and the front-passenger seat side target discharge air temperature TAOPa is obtained, and an inside/outside air mode is determined based the average value and a characteristic diagram shown in FIG. 6. Specifically, when the average value is increased, the inside/outside air mode is switched from a inside air mode to an outside air mode.

Here, at the time of inside air mode, the inside/outside air switching door 11 is driven by the servo-motor 11a, so that the inside air intake opening 10a is fully opened, and the outside air intake opening 10b is fully closed. Alternatively, at the time of outside air mode, the inside/outside air switching door 11 is driven by the servo-motor 11a, so that the inside air intake opening 10a is fully closed, and the outside air intake opening 10b is fully opened.

Figure 7:
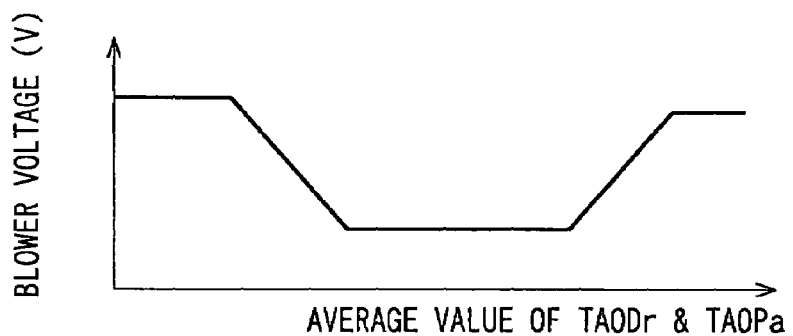
FIG. 7 is another graph showing the operation of the control unit.

Next, based on the average value of TAODr and TAOPa and a characteristic diagram shown in FIG. 7, a blower voltage (V), which is applied to the drive motor 12a of the blower 12 of the front seat air conditioning unit 1, is determined. In other words, a target air flow rate is determined. Specifically, when the average value (hereinafter referred to as an average target value) of TAODr and TAOPa is in an intermediate range, the blower voltage is constant. Also, when the average target value is increased from the intermediate range, the blower voltage is increased. Furthermore, when the average target value is decreased from the intermediate range, the blower voltage is increased.

A target degree of opening θDr of the air mix door 15 on the driver seat side and a target degree of opening θPa of the air mix door 15 on the front-passenger seat side are computed through the following third equation based on the computed TAODr and TAOPa.

$$\theta(i)=\{(Tao(i)-TeFr)/(Tw-TeFr)\}\times 100(\%) \quad \text{(Third Equation)}$$

In the third equation, (i) is selected from Dr or Pa.

Upon computation of the target degree of opening θDr and the target degree of opening θPa, the servo-motor 15a is controlled, so that the actual degree of opening of each air mix door 15 is adjusted to the corresponding target degree of opening θDr, θPa.

Figure 8:
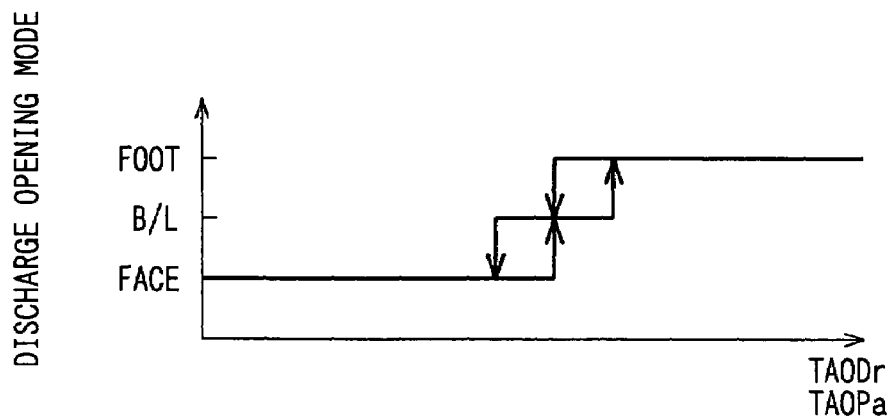
FIG. 8 is another graph showing the operation of the control unit.

Next, the driver seat side discharge opening mode and the front-passenger seat side discharge opening mode of the front seat air conditioning unit 1 are determined according to a characteristic diagram of FIG. 8 based on TAODr and TAOPa. Specifically, when TAODr is increased, the driver seat side discharge opening mode is shifted from a face mode, a bi-level (B/L) mode and a foot mode in this order. When TAOPa is increased, the front-passenger seat side discharge opening mode is shifted from the face mode, the bi-level (B/L) mode and the foot mode in this order.

Here, when the face mode is set as the driver seat side discharge opening mode, the servo-motor 16a is driven, so that the face-side discharge opening 100Dr on the driver seat side is opened by the corresponding discharge opening switching door 16 driven by the servo-motor 16a. In this way, the conditioning air is blown from the face-side discharge opening 100Dr on the driver seat side toward the upper-half body of the driver.

When the foot mode is set as the driver seat side discharge opening mode, conditioning air is blown from the foot side discharge opening on the driver seat side toward the feet of the driver. When the bi-level mode is set as the driver seat side discharge opening mode, conditioning air is blown from the face-side discharge opening 100Dr on the driver seat side toward the upper-half body of the driver and is also blown from the foot side discharge opening on the driver seat side toward the feet of the driver.

Furthermore, when the face mode is set as the front-passenger seat side discharge opening mode, the servo-motor 16a is driven, so that the face-side discharge opening 100Pa on the front-passenger seat side is opened by the corresponding discharge opening switching door 16 driven by the servo-motor 16a. In this way, the conditioning air is blown from the face-side discharge opening 100Pa on the front-passenger seat side toward the upper-half body of the occupant in the front-passenger seat 102.

When the foot mode is set as the front-passenger seat side discharge opening mode, conditioning air is blown from the foot side discharge opening on the front-passenger seat side toward the feet of the occupant in the front-passenger seat 102. When the bi-level mode is set as the front-passenger seat side discharge opening mode, conditioning air is blown from the face-side discharge opening 100Pa on the front-passenger seat side toward the upper-half body of the occupant in the front-passenger seat 102 and is also blown from the foot side discharge opening on the front-passenger seat side toward the feet of the occupant in the front-passenger seat 102.

Figure 5:
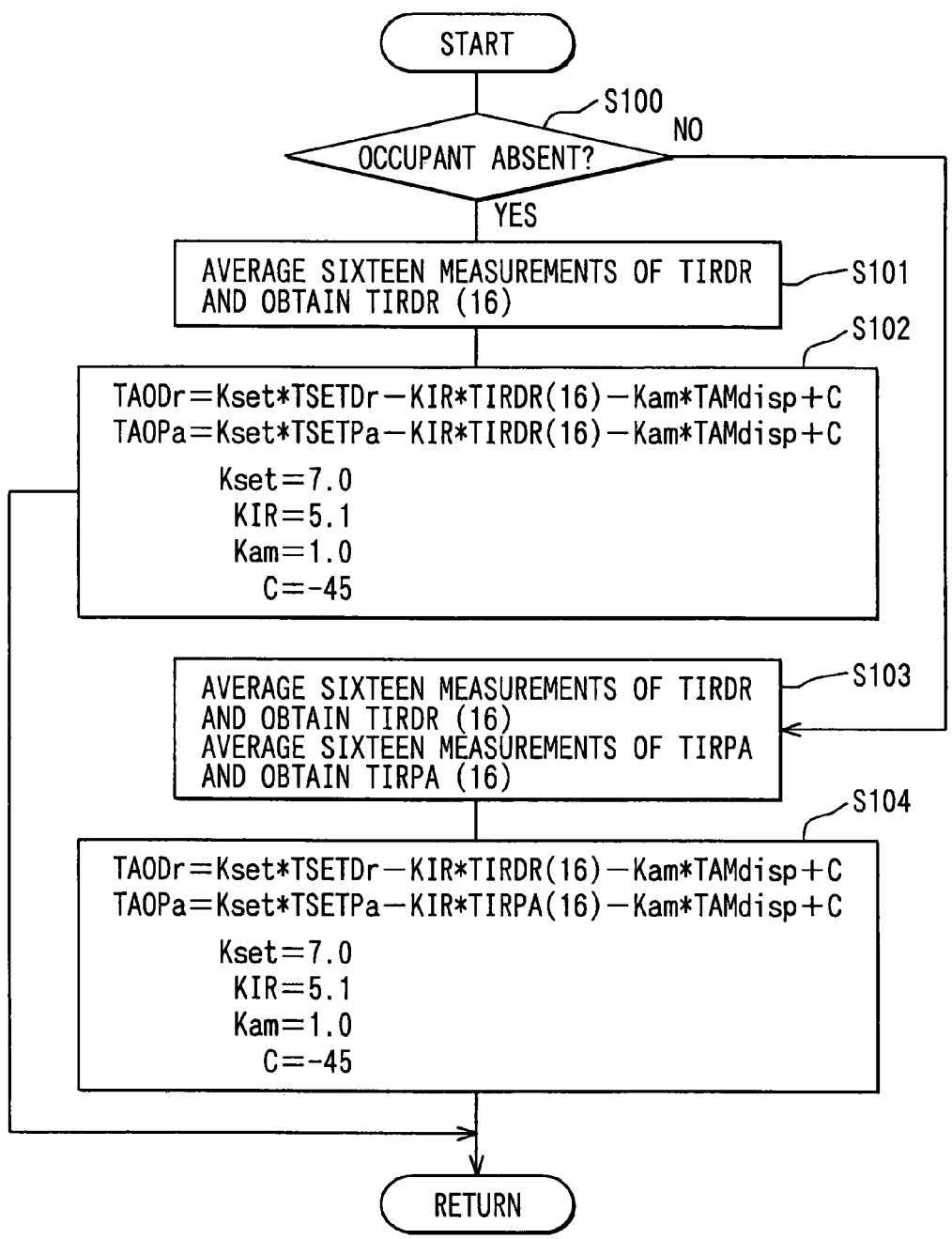
FIG. 5 is a flowchart showing control operation of a control unit of the air conditioning system shown in FIG. 1.

As described above, when the above control operation of the front seat air conditioning unit 1 is completed, control returns to step S100 in FIG. 5. Unless the absence of the occupant is determined, the occupant presence determination process (S100), the temperature obtaining and averaging process (S103) and the target discharge air temperature computing process (S104) are repeated.

Thereafter, when the occupant in the front-passenger seat 102 exits the vehicle, and thus the occupant is absent in the front-passenger seat 102, the pressure applied to the front-passenger seat occupant detecting sensor 38 becomes less than the predetermined value. As a result, YES is returned at step S100 in FIG. 5.

Then, control proceeds to step S101. At step S101, the measured surface temperature TIRDR of the driver, which is measured with the non-contacting temperature sensor 34a, is obtained. Then, the last fifteen measurements of the surface temperature TIRDR each obtained at step S101 in each cycle and the current measurement of the surface temperature TIRDR are averaged, so that the latest sixteen measurements are averaged to obtain the average temperature TIRDR(16) at step S101.

Next, control proceeds to step S102. At step S102, the average temperature TIRDR(16) is applied to the following fourth and fifth equations to obtain the driver seat side target discharge air temperature TAODr and the front-passenger seat side target discharge air temperature TAOPa.

$$\text{TAODr}=K\text{set}\times\text{TSETDr}-K\text{IR}\times\text{TIRDR}(16)-K\text{am}\times\text{TAMdisp}+C \quad \text{(Fourth Equation)}$$

$$\text{TAOPa}=K\text{set}\times\text{TSETPa}-K\text{IR}\times\text{TIRDR}(16)-K\text{am}\times\text{TAMdisp}+C \quad \text{(Fifth Equation)}$$

The driver seat side target discharge air temperature TAODr and the front-passenger seat side target discharge air temperature TAOPa are computed based on the same measured surface temperature TIRDR and thus should be close to each other or should coincide with each other in some cases.

Then, similar to step S104, the inside/outside air mode is determined based on TAODr and TAOPa, and the inside/outside air switching door 11 is driven by the servo-motor 11a in a manner that corresponds to the determined mode. Furthermore, the blower voltage applied to the drive motor 12a of the blower 12 of the front seat air conditioning unit 1 is determined based on TAODr and TAOPa. The determined blower voltage is then applied to the drive motor 12a to generate the air flow from the blower 12 at the target air flow rate.

Then, the target degree of opening θDr of the air mix door 15 on the driver seat side and the target degree of opening θPa of the air mix door 15 on the front-passenger seat side are computed based on TAODr and TAOPa. Upon computation of the target degree of opening θDr and the target degree of opening θPa, the servo-motor 15a is controlled, so that the actual degree of opening of each air mix door 15 is adjusted to the corresponding target degree of opening θDr, θPa. Next, the driver seat side discharge opening mode and the front-passenger seat side discharge opening mode are determined based on TAODr and TAOPa. Then, the servo-motor 16a is driven based on each determined discharge opening mode to drive the discharge opening switching door 16 to open or close each corresponding face-side discharge opening 100Dr, 100Pa.

Next, more specific operation of the front seat air conditioning unit 1 will be described with reference to the case where the face mode (or alternatively the bi-level mode) is set on both the driver seat side and the front-passenger seat side.

First, the servo-motors 11a, 15a, 16a and the drive motor 12a are controlled based on the inside/outside air mode, the target air flow rate, each target degree of opening θDr, θPa, and each discharge opening mode.

Here, when the blower 12 is driven, air is drawn into the duct 10 through one of the inside air intake opening 10a and the outside air intake opening 10b. When the drawn air passes through the evaporator 13, the drawn air is cooled through heat exchange between the drawn air and refrigerant supplied to the evaporator 13. The cooling capacity of the evaporator 13 is adjusted by the air conditioning ECU 3, which adjusts the flow rate of refrigerant in the refrigeration cycle and in the evaporator 13 through operation of a compressor based on the measurement of the post-evaporator air temperature TeFr.

The cooled air cooled by the evaporator 13 flows through each of the driver seat side passage 10c and the front-passenger seat side passage 10d. In the driver seat side passage 10c, the air is divided into a portion, which is conducted to the heater core 14, and another portion, which bypasses the heater core 14. A ratio (hereinafter referred to as a driver seat side ratio) of the air conducted to the heater core 14 and the air bypassed the heater core 14 is adjusted by controlling a degree of opening of the air mix door 15 on the driver seat side.

When the air conducted to the heater core 14 passes the heater core 14, the air is heated through heat exchange between the air and the engine coolant (hot coolant). Then, the heated air is mixed with the air bypassed the heater core 14, and the mixed air is discharged through the discharge opening 100Dr on the driver seat side.

Similar to the driver seat side passage 10c, in the front-passenger seat side passage 10d, the air is divided into a portion, which is conducted to the heater core 14, and another portion, which bypasses the heater core 14. A ratio (hereinafter referred to as a front-passenger seat side ratio) of the air conducted to the heater core 14 and the air bypassed the heater core 14 is adjusted by controlling a degree of opening of the air mix door 15 on the front-passenger seat side. When the air conducted to the heater core 14 passes the heater core 14, the air is heated. Then, the heated air is mixed with the bypassed air, which has bypassed the heater core 14, and the mixed air is discharged through the discharge opening 100Pa on the front-passenger seat side.

As described above, when the occupant is present in the front-passenger seat 102, the ratio of the air conducted to the heater core 14 and the air bypassed the heater core 14 is adjusted independently by controlling the degree of opening of the air mix door 15 in each of the driver seat side passage 10c and the front-passenger seat side passage 10d. Thus, the ratio of the air heated by the heater core 14 and the air bypassed the heater core 14 is adjusted independently. As a result, the temperature of air discharged through the discharge opening 100Dr on the driver seat side and the temperature of air discharged through the discharge opening 100Pa on the front-passenger seat side are adjusted independently of each other.

On the other hand, when the occupant is absent in the front-passenger seat 102, the front-passenger seat side target discharge air temperature TAOPa substantially coincides with or becomes closer to the driver seat side target discharge air temperature TAODr. Thus, the degree of opening of the air mix door 15 on the front-passenger seat side substantially coincides with or becomes closer to the degree of opening of the air mix door 15 on the driver seat side. As a result, the temperature of air discharged through the discharge opening 100Pa on the front-passenger seat side substantially coincides with or becomes closer to the temperature of air discharged through the discharge opening 100Dr on the driver seat side.

In addition, the flow rate of air discharged through the discharge opening 100Pa on the front-passenger seat side substantially coincides with or becomes closer to the flow rate of air discharged through the discharge opening 100Dr on the driver seat side. Thus, the air conditioning state of the front-passenger seat air conditioning zone 102a substantially coincides with or becomes closer to the air conditioning state of the driver seat air conditioning zone 101a. As a result, it is possible to limit or reduce flow of uncomfortable air, which is uncomfortable to the driver, from the front-passenger seat air conditioning zone 102a into the driver seat air conditioning zone 101a. Therefore, the comfortable air conditioning can be provided to the driver.

Second Embodiment

In the first embodiment, when the occupant is absent in the front-passenger seat 102, a value of the measured surface temperature TIRDR of the driver, which is measured with the non-contacting temperature sensor 34a, is used to compute the front-passenger seat side target discharge air temperature TAOPa. In the second embodiment, alternatively, a value of the driver seat side target discharge air temperature TAODr is used as a value of the front-passenger seat side target discharge air temperature TAOPa.

Figure 9:
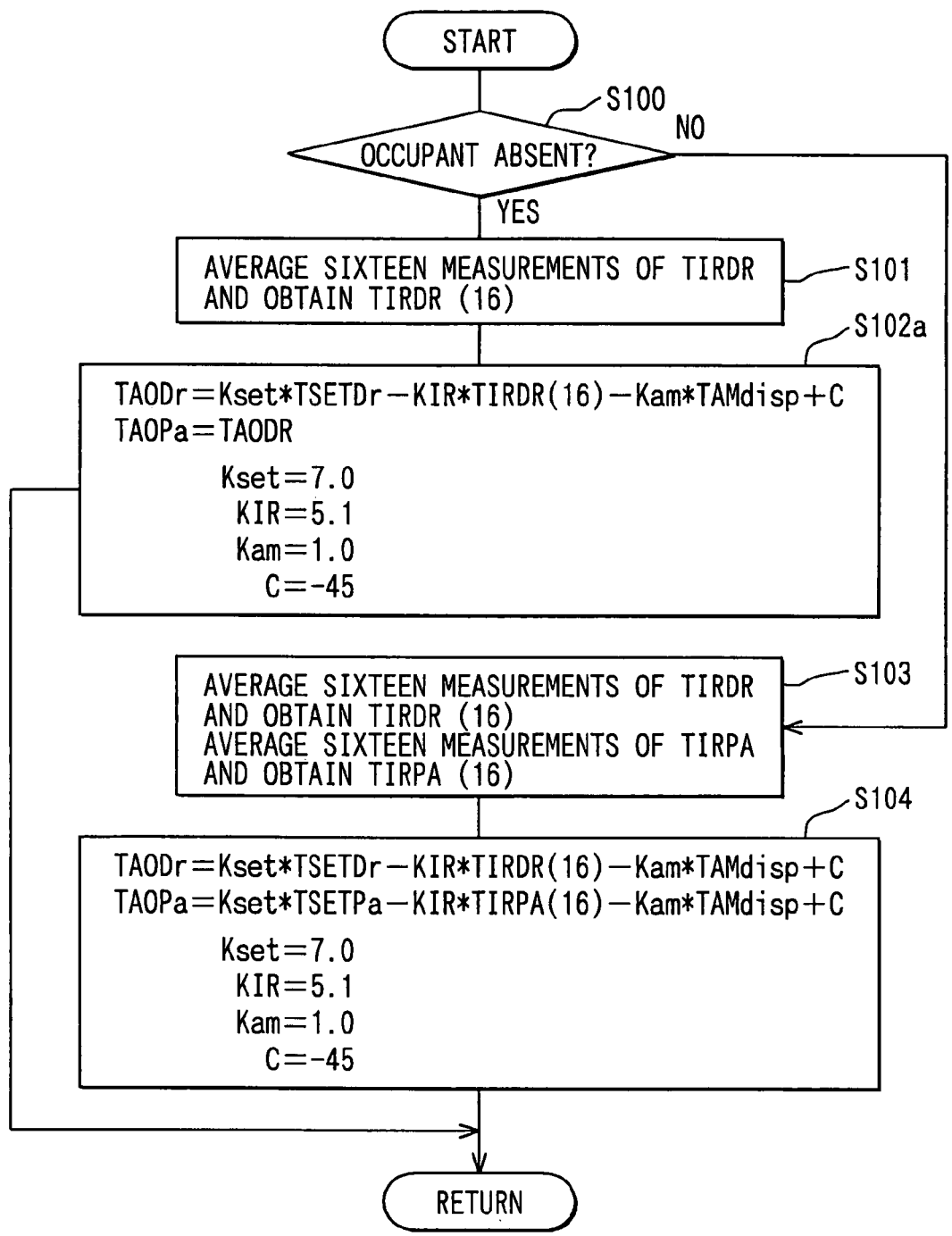
FIG. 9 is a flowchart showing operation of a control unit of an air conditioning system according to a second embodiment of the present invention.

Specifically, the air conditioning ECU 3 performs the air conditioning control operation according to a flowchart shown in FIG. 9 in place of the flowchart shown in FIG. 5. Steps S100, S101, S103, S104 of FIG. 9 are substantially the same as steps S100, S101, S103, S104, respectively, of FIG. 5.

In the present embodiment, when it is determined that the occupant is absent in the front-passenger seat 102 at step S100, control proceeds to step S101. Then, the average temperature TIRDR(16) is obtained at step S101 and is applied to the above-described fourth equation to obtain the driver seat side target discharge air temperature TAODr at step S102a. Then, at step S102a, a value of the driver seat side target discharge air temperature TAODr is used as a value of the front-passenger seat side target discharge air temperature TAOPa.

In this way, the same control operation is performed for the target degree of opening θDr, θPa and the discharge opening mode in each of the driver seat side and the front-passenger seat side. Thus, the air conditioning state of the front-passenger seat air conditioning zone 102a and the air conditioning state of the driver seat air conditioning zone 101a substantially coincide with one another. As a result, it is possible to limit flow of uncomfortable air, which is uncomfortable to the driver, from the front-passenger seat air conditioning zone 102a into the driver seat air conditioning zone 101a. Therefore, the comfortable air conditioning can be provided to the driver.

Figure 10:
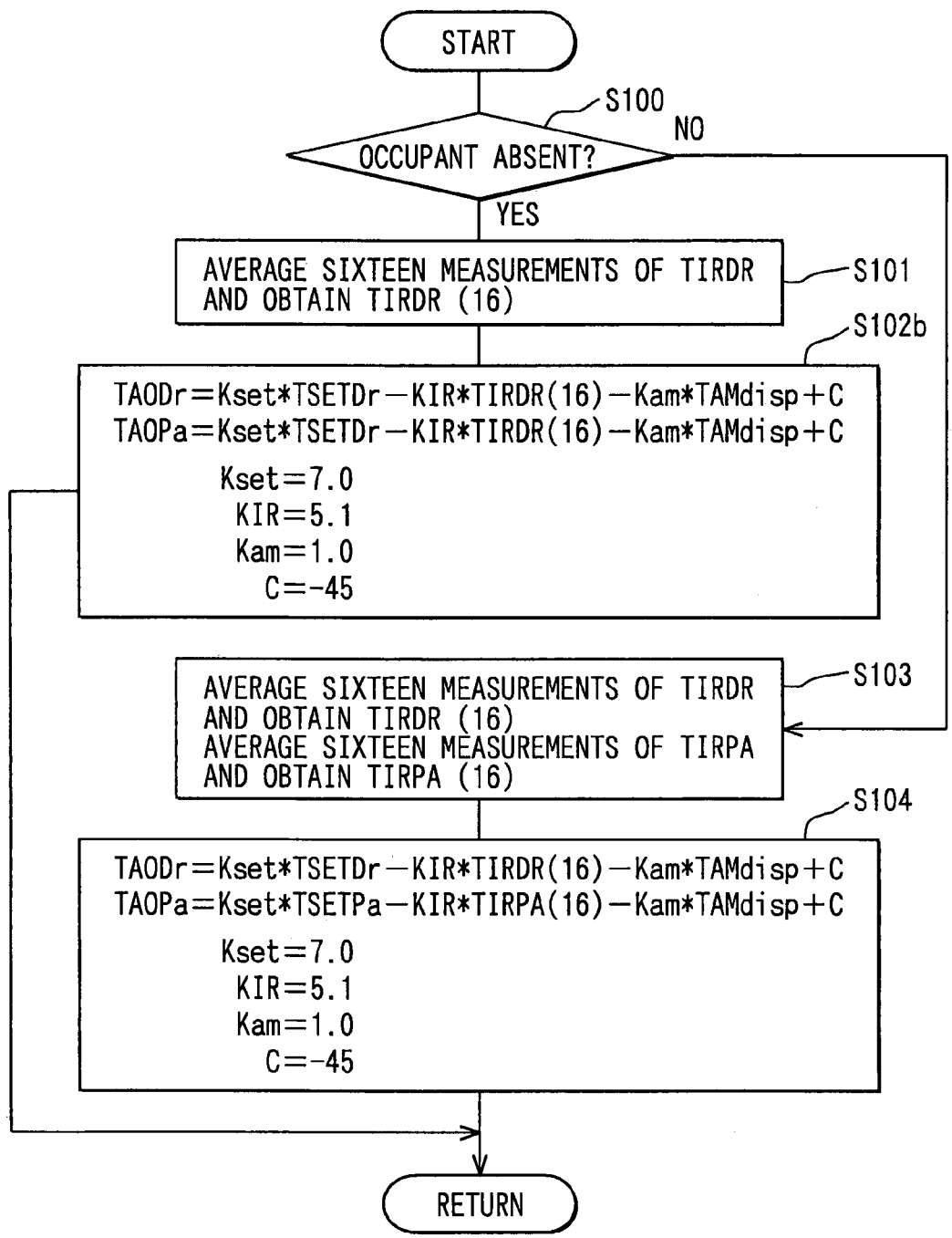
FIG. 10 is a flowchart showing a modification of the second embodiment.

In the above embodiment, the air conditioning control operation is performed by the air conditioning ECU 3 according to the flowchart shown in FIG. 9. Alternatively, the air conditioning control operation can be performed by the air conditioning ECU 3 according to a flowchart shown in FIG. 10. In this case, at the time of computing the front-passenger seat side target discharge air temperature TAOPa, a value of the preset temperature TSETDr for the driver seat air conditioning zone 101a is used as a value of the preset temperature TSETPa for the front-passenger seat air conditioning zone 102a, and a value of the measured surface temperature TIRDR of the driver is used as a value of the measured surface temperature TIRPA of the occupant in the front-passenger seat 102. Thus, the driver seat side target discharge air temperature TAODr and the front-passenger seat side target discharge air temperature TAOPa substantially coincide with one another.

Third Embodiment

In the first embodiment, when the occupant is absent in the front-passenger seat 102, the front-passenger seat side target discharge air temperature TAOPa is computed using a value of the measured surface temperature TIRDR of the driver measured with the non-contacting temperature sensor 34a. Alternatively, in the third embodiment, a predetermined value is used as a value of the measured surface temperature of a non-existing occupant in the front-passenger seat 102 to be measured with the non-contacting temperature sensor 34b in computation of the front-passenger seat side target discharge air temperature TAOPa.

Figure 11:
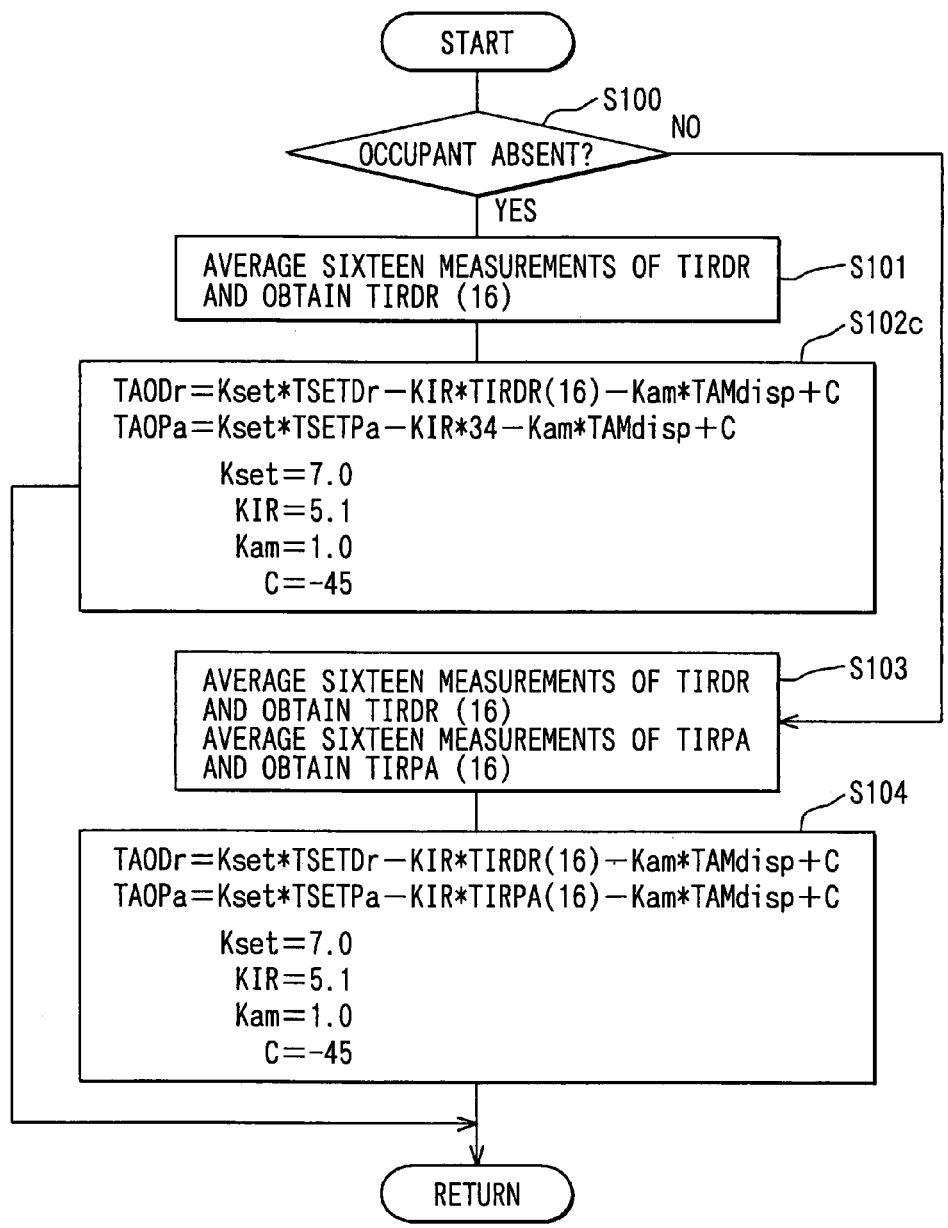
FIG. 11 is a flowchart showing operation of a control unit of an air conditioning system according to a third embodiment of the present invention.

The air conditioning ECU 3 of the present embodiment performs the air conditioning control operation according to a flowchart shown in FIG. 11 in place of the flowchart shown in FIG. 5. Steps S100, S101, S103, S104 of FIG. 11 are substantially the same as steps S100, S101, S103, S104, respectively, of FIG. 5.

In the third embodiment, when it is determined that the occupant is absent in the front-passenger seat 102 at step S100, control proceeds to step S101 where the average temperature TIRDR(16) is obtained. Then, control proceeds to step S102c. At step S102c, the average temperature TIRDR (16) obtained at step S101 is applied to the above-described fourth equation to obtain the driver seat side target discharge air temperature TAODr. Then, at step S102c, the predetermined value (34 degrees Celsius in the present embodiment) is used as the surface temperature of the upper-half body of the non-existing occupant in the front-passenger seat 102 to compute the front-passenger seat side target discharge air temperature TAOPa according to the following sixth equation.

TAOPa=$K$set×TSETPa−KIR×34−$K$am×TAMdisp+$C$ (Sixth Equation)

The target degree of opening θPa of the air mix door 15 and the discharge opening mode of the front-passenger seat side are controlled based on the thus computed front-passenger seat side target discharge air temperature TAOPa to substantially coincide with or becomes closer to those of the driver seat side. In this way, the air conditioning state of the front-passenger seat air conditioning zone 102a substantially coincide with or becomes closer to the air conditioning state of the driver seat air conditioning zone 101a. As a result, it is possible to limit or reduce flow of uncomfortable air, which is uncomfortable to the driver, from the front-passenger seat air conditioning zone 102a into the driver seat air conditioning zone 101a. Therefore, the comfortable air conditioning can be provided to the driver.

Fourth Embodiment

In the first embodiment, the way of providing the comfortable air conditioning to the driver at the time of absence of the occupant in the front-passenger seat 102 is described. In the fourth embodiment, there is described a way of immediately providing comfortable air conditioning to the occupant when the occupant gets into the vehicle and is seated in the seat.

Figure 12:
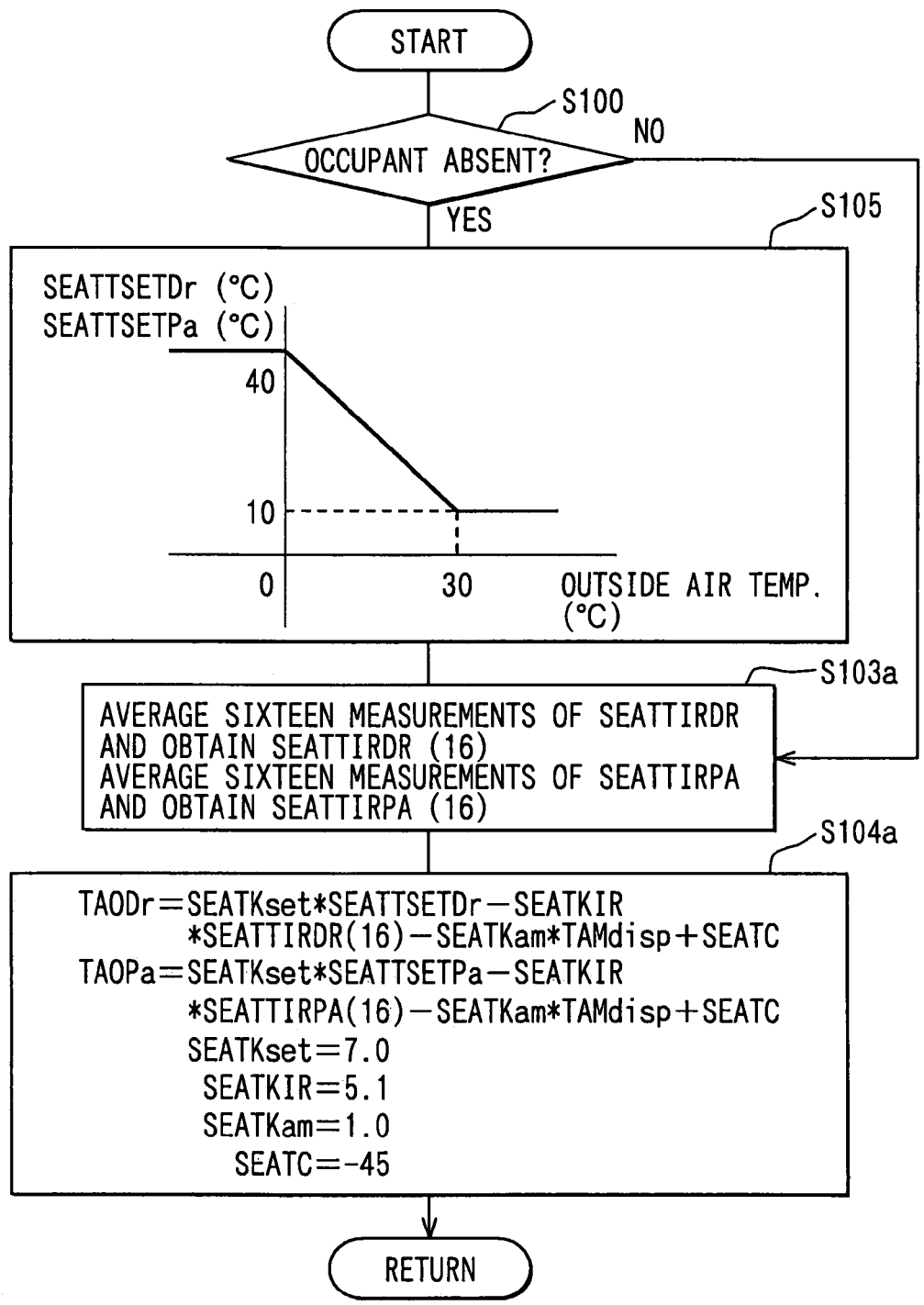
FIG. 12 is a flowchart showing operation of a control unit of an air conditioning system according to a fourth embodiment of the present invention.

In the fourth embodiment, the air conditioning ECU 3 performs the air conditioning operation according to a flowchart shown in FIG. 12 in place of the flowchart shown in FIG. 5. Step S100 of FIG. 12 is the same as step S100 of FIG. 5.

When the power supply is turned on, the air conditioning ECU 3 executes or starts a control program stored in a memory and performs the air conditioning operation according to the flowchart shown in FIG. 12.

First, when it is determined that the occupant is absent in the front-passenger seat 102 based on the measurement signal outputted from the front-passenger seat occupant detecting sensor 38 at step S100, control proceeds to step S105. At step S105, a desired preset temperature SEATTSETDr of a surface of the driver seat 101 and a desired preset temperature SEATTSETPa of a surface of the front-passenger seat 102 are determined based on the outside air temperature measured with the outside air temperature sensor 31. Specifically, when the outside air temperature increases, the preset temperatures (predetermined temperature values) SEATTSETDr, SEATTSETPa are decreased accordingly.

Next, control proceeds to step S103a. At step S103a, a surface temperature SEATTIRDR (indicating the surface temperature of the driver), which is measured with the non-contacting temperature sensor 34a, is obtained. Then, the last fifteen measurements of the surface temperature SEATTIRDR and the current measurement of the surface temperature SEATTIRDR are averaged, so that the latest sixteen measurements are averaged. The averaged surface temperature will be referred to as the average temperature SEATTIRDR(16).

Then, a surface temperature SEATTIRPA of the front-passenger seat (indicating the surface temperature of the front-passenger seat), which is measured with the non-contacting temperature sensor 34b, is obtained. Then, the last fifteen measurements of the surface temperature SEATTIRPA and the current measurement of the surface temperature SEATTIRPA are averaged, so that the latest sixteen measurements are averaged. The averaged surface temperature will be referred to as the average temperature SEATTIRPA (16).

The thus obtained average temperatures SEATTIRDR(16), SEATTIRPA(16) and the preset temperatures SETTSETDr, SEATTSETPa are applied to the following seventh and eighth equations to obtain the driver seat side target discharge air temperature TAODr and the front-passenger seat side target discharge air temperature TAOPa. In the following seventh and eighth emodiments, SEATKset(=7.0) is a coefficient for the preset temperature, SEATKIR (=5.1) is an IR coefficient, SEATKam (=1.0) is a coefficient for the outside air temperature, and SEATC (=−45) is a correction coefficient. Furthermore, a unit of each of the desired preset temperatures SEATTSETDr, SEATTSETPa, the surface temperatures SEATTIRDR, SEATTIRPA and the measured outside air temperature TAMdisp is degrees Celsius.

TAODr=SEATKset×SEATTSETDr−SEATKIR×SEATTIRDR(16)−SEATKam×TAMdisp+SEATC (Seventh Equation)

TAOPa=SEATKset×SEATTSETPa−SEATKIR×SEATTIRPA(16)−SEATKam×TAMdisp+SEATC (Eighth Equation)

Upon computation of the driver seat side target discharge air temperature TAODr and the front-passenger seat side target discharge air temperature TAOPa, control operation of the target degree of opening θDr, θPa of each air mix door 15 and the discharge opening mode of each of the front-passenger seat side and the driver seat side is performed based on the driver seat side target discharge air temperature TAODr and the front-passenger seat side target discharge air temperature TAOPa. Thus, the air conditioning state of the front-passenger seat air conditioning zone 102a is controlled, so that the seat temperature of the front-passenger seat 102 (thermal sensation of the occupant induced by the seat) substantially coincides with the SEATTSETPa. In this way, when the occupant is seated in the front-passenger seat 102, comfortable air conditioning is immediately provided to the occupant.

Returning to step S100, when it is determined that the occupant is present in the front-passenger seat 102, control proceeds to step S103a and then to step S104a. At step S104a, the preset temperature SEATTSETDr of the seat surface temperature of the driver seat 101 and the preset temperature SEATTSETPa of the seat surface temperature of the front-passenger seat 102 are not determined based on the outside air temperature. Rather, a value of the preset temperature TSETDr is used as a value of the preset temperature SEATT-SETDr, and a value of the preset temperature TSETPa is used as a value of the preset temperature SEATTSETPa. Then, the driver seat side target discharge air temperature TAODr and the front-passenger seat side target discharge air temperature TAOPa are obtained in the manner described above using the preset temperatures TSETDr, TSETPa as the preset temperatures SEATTSETDr, SEATTSETPa, respectively. Control operation of the target degree of opening θDr, θPa of each air mix door 15 and the discharge opening mode of each of the front-passenger seat side and the driver seat side is performed based on the driver seat side target discharge air temperature TAODr and the front-passenger seat side target discharge air temperature TAOPa.

Modifications

In the fourth embodiment, the temperature (seat temperature) of the front-passenger seat 102 is adjusted to the predetermined temperature when the occupant is absent in the front-passenger seat 102. The same principal can be applied to the driver seat 101. That is, when the driver is absent in the driver seat 101, the temperature of the driver seat 101 can be controlled to a predetermined temperature. Also, the same principal can be applied to the rear seat 103. That is, when the occupant is absent in the rear seat 103, the temperature of the rear seat 103 can be controlled to a predetermined temperature. Furthermore, in the fourth embodiment, in order to control the temperature (seat temperature) of the seat, it is preferred to provide a discharge opening in a ceiling of the passenger compartment 100 to discharge conditioning air to the seat.

Furthermore, in the fourth embodiment, the conditioning air discharged from the discharge opening is used to control the surface temperature (seat temperature) of the seat to the predetermined temperature. Alternatively, the seat can be provided with a seat air conditioning system to control the surface temperature (seat temperature) of the seat to a predetermined temperature. That is, like a seat air conditioning system disclosed in Japanese Unexamined Patent Publication No. 2002-234332, a plurality of discharge openings or holes can be provided in a cover of the seat, and warm air or cold air can be discharged from the openings to control the surface temperature (seat temperature) of the seat to the predetermined temperature. In such a case, the conditioning air supplied to the seat can be generated from the air conditioning unit 1 shown in FIG. 1.

In the first to third embodiments, the air conditioning control operation is performed such that the air conditioning state of the front-passenger seat side substantially coincides with or becomes closer to the air conditioning state of the driver seat side to limit or reduce the flow of uncomfortable air from the front-passenger seat side to the driver seat side. The present invention is not limited to this. For example, when the occupant is absent in the rear seat 103, the air conditioning control operation can be performed such that the air conditioning state of the rear seat side substantially coincides with or becomes closer to the air conditioning state of the driver seat side to limit or reduce the flow of uncomfortable air from the rear seat side to the driver seat side.

In the first embodiment, when the occupant is absent in the front-passenger seat 102, the value of TIRDR(16) is used in place of TIRPA(16) in computation of the TAOPa at step S102 in FIG. 5. Alternatively, in the computation of the TAOPa at step S102 in FIG. 5, any value, which is closer to the value of TIRDR(16) than the value of TIRPA(16) obtained from the temperature measurements of the empty front-passenger seat 102 with no occupant, can be used in place of the value of TIRDR(16). Even when the air conditioning of the front-passenger seat air conditioning zone 102a is performed using the thus obtained target discharge air temperature TAOPa, the degree of uncomfortableness of the air flow from the front-passenger seat side to the driver seat side can be alleviated.

Also, in the first embodiment, when the preset temperature TSETPa for the front-passenger seat air conditioning zone 102a differs from the preset temperature TSETDr for the driver seat air conditioning zone 101a, the preset temperature TSETPa can be adjusted to a value, which coincides with or is closer to the preset temperature TSETDr. This adjustment of the preset temperature TSETPa can be performed alternative to the adjustment of the TIRPA(16) performed at step S102 in FIG. 5 in computation of the target discharge air temperature TAOPa.

In the second embodiment, the value of the driver seat side target discharge air temperature TAODr is used as a value of the front-passenger seat side target discharge air temperature TAOPa at step S102a in FIG. 9. Alternatively, in computation of TAOPa at step S102a in FIG. 9, any value, which is closer to the value of TAODr than the value of TAOPa obtained from the above-described fifth equation using the TIRPA(16) of the empty front-passenger seat 102 with no occupant, can be used as the value of TAOPa at step S102a in FIG. 9.

Additional advantages and modifications will readily occur to those skilled in the art. The invention in its broader terms is therefore not limited to the described specific details.

What is claimed is:

1. An air conditioning system for a vehicle that includes a first seat and a second seat, the air conditioning system comprising:
a first discharge opening for discharging conditioning air around the first seat;
a second discharge opening for discharging conditioning air around the second seat;
a first non-contacting temperature sensor for measuring a surface temperature of an occupant seated in the first seat without contacting the occupant in the first seat;
a second non-contacting temperature sensor for measuring a surface temperature of an occupant seated in the second seat without contacting the occupant in the second seat;
occupant detecting means for detecting presence of the occupant in one of the first and second seats;
air conditioning control means for independently controlling air conditioning around the first seat and air conditioning around the second seat according to a first target discharge air temperature determined for the conditioning air to be discharged from the first discharge opening and a second target discharge air temperature determined for the conditioning air to be discharged from the second discharge opening; and an outside air temperature sensor for measuring a temperature of air outside a passenger compartment of the vehicle, wherein:

the air conditioning control means determines the first target discharge air temperature based on a temperature measurement of the first non-contacting temperature sensor and a desired preset temperature of air around the first seat and also determines the second target discharge air temperature based on a temperature measurement of the second non-contacting temperature sensor and a desired preset temperature of air around the second seat;

when the occupant detecting means indicates absence of the occupant in one of the first and second seats, the air conditioning control means controls the air conditioning state around the one of the first and second seats in such a manner that the temperature measurement associated with the one of the first and second seats substantially coincides with a predetermined desired preset temperature value; and the air conditioning control means determines the predetermined desired preset temperature value based on the outside air temperature measured with the outside air temperature sensor.

2. The air conditioning system according to claim 1, wherein when the occupant detecting means indicates the absence of the occupant in the one of the first and second seats, the air conditioning control means adjusts one of the temperature measurement, the preset temperature and the target discharge air temperature associated with the one of the first and second seats and controls the air conditioning state around the one of the first and second seats based on the adjusted one of the temperature measurement, the preset temperature and the target discharge air temperature associated with the one of the first and second seats.

* * * * *